United States Patent
Kuhlmann

[11] 3,886,847
[45] June 3, 1975

[54] PANTOGRAPH COPY MILLING MACHINE WITH DRAWING TRACING DEVICE

[75] Inventor: Franz Kuhlmann, Wilhelmshaven, Germany

[73] Assignee: Franz Kuhlmann KG, Prazisionsmechanik und Maschinebau, Bad Lauterberg, Harz, Germany

[22] Filed: Apr. 27, 1972

[21] Appl. No.: 247,992

[30] Foreign Application Priority Data
Apr. 30, 1971 Germany.............................. 7116898

[52] U.S. Cl.................... 90/13.8; 33/25 R; 90/13.1
[51] Int. Cl. ............................................... B23c 1/16
[58] Field of Search........ 90/13.1, 13 C, 62 A, 13.5, 90/13.8; 33/25 R, 25 A, 25 B, 25 C, 25 D, 25 E, 23 E; 83/565

[56] References Cited
UNITED STATES PATENTS
| | | | |
|---|---|---|---|
| 1,923,208 | 8/1933 | Howey | 83/565 X |
| 2,164,169 | 6/1939 | Wohlfarth | 90/62.1 |
| 2,718,702 | 9/1955 | Glass, Jr. | 33/25 R |
| 2,832,239 | 4/1958 | Bert et al. | 90/62.1 |
| 3,289,540 | 12/1966 | Bardwell et al. | 90/62.1 |
| 3,453,933 | 7/1969 | Kornhauser | 33/25 B |
| 3,548,710 | 12/1970 | Kaplan | 90/13.1 |

FOREIGN PATENTS OR APPLICATIONS
727,764  11/1942  Germany .............................. 90/13.1

Primary Examiner—Andrew R. Juhasz
Assistant Examiner—Z. R. Bilinsky
Attorney, Agent, or Firm—Weingarten, Maxham & Schurgin

[57] ABSTRACT

A pantograph milling machine mills in accordance with a tracing from a drawing. The invention constructs the tracing device as an electron optic reading head.

5 Claims, 5 Drawing Figures

PANTOGRAPH COPY MILLING MACHINE WITH DRAWING TRACING DEVICE

The invention relates to a pantograph copy milling machine for milling in accordance with a drawing by means of a tracing device.

In a known machine of this kind the tracer pin of the pantograph is manually guided along the drawing line which is to be copied.

It is the object of the invention to automate this process and to provide a copy milling machine with a tracing device by means of which milling operations may be automatically performed in accordance with a drawing.

This problem is solved in that the tracing device is constructed as an electro-optical reading head which automatically traces the drawing contours and the horizontal motions of the reading head or of a drawing support table are transmitted through a linkage to the pantograph.

One advantageous embodiment of the invention is characterised in that the electro-optical reading head is mounted on the frame of the tracing device so as to be vertically adjustable thereon and the drawing support table is adapted to slide in upper guideways by means of a first servomotor in the direction of the Y-axis and together therewith is adapted to slide in lower guides by means of a second servomotor in the direction of the X-axis.

A further embodiment of the subject of the invention is characterised in that the photo-electric reading head is mounted on retaining means which are traversable in the direction of the X-axis on a cross slide which in turn is slidable in guideways of the drawing support table in the direction of the Y-axis. A first servomotor is provided to traverse the cross slide on the table guideways and a further servomotor is provided to traverse the reading head on the cross slide. The endface of the reading head retaining means of this embodiment has an arm rigidly mounted thereon, the pantograph linkage being hinged to said arm.

The last mentioned embodiment with the stationary drawing support table and reading head which is traversable in the horizontal plane offers the advantage, compared with the first mentioned embodiment, that the moving masses may be minimised and that even large drawing sheets may be mounted on the drawing support table.

Embodiments of the pantograph engraving machine and of the drawing-tracing device are explained hereinbelow by reference to the drawing in which.

Figure 1:
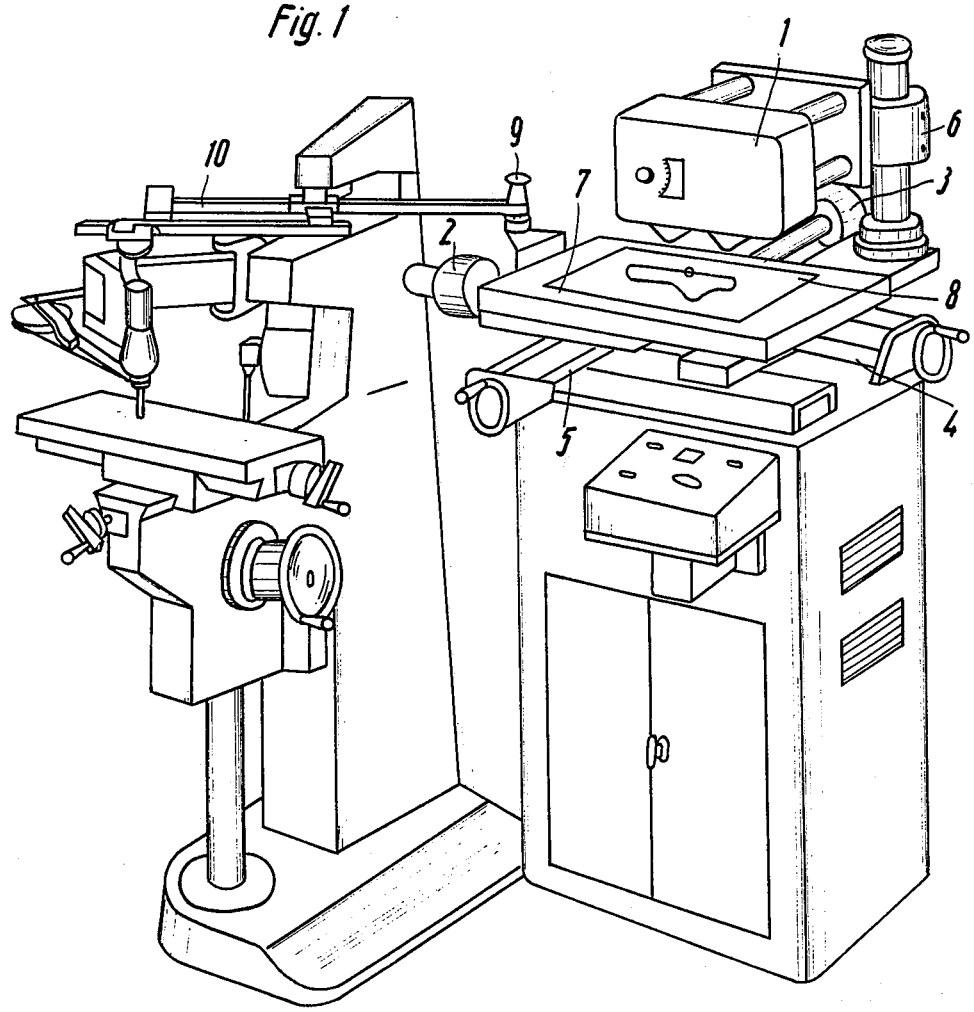
FIG. 1 is a perspective view of the engraving machine with drawing-tracing device.
Figure 2:
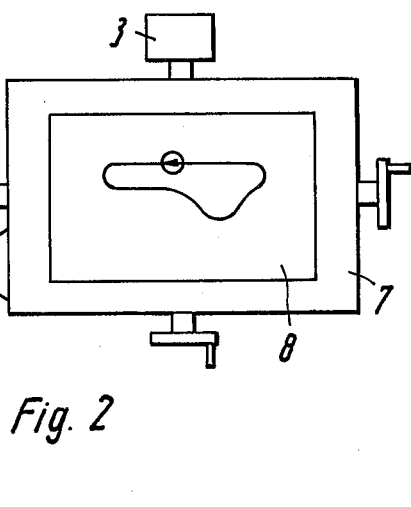
FIG. 2 is a plan view of the drawing-tracing device, and of part of the pantograph.

The drawing-tracing device illustrated in FIG. 1 together with the pantograph engraving machine contains an electro-optical reading head 1 which is mounted on the frame of the apparatus so as to be vertically adjustable thereon. Lower guideways 5, in which upper guideways 4 are retained so as to be slidable in the Y-direction, are provided on the frame. The drawing support table 7 slides in the X-direction in the above mentioned upper guideways. A servomotor 2 is provided to traverse the drawing support table 7 in the Y-direction and a further servomotor 3 is provided for traversing in the X-direction. A drawing 8 is mounted on the drawing support table 7. A tracer pin 9 for the pantograph 10 is hinged to the drawing support table 7.

Figure 3:
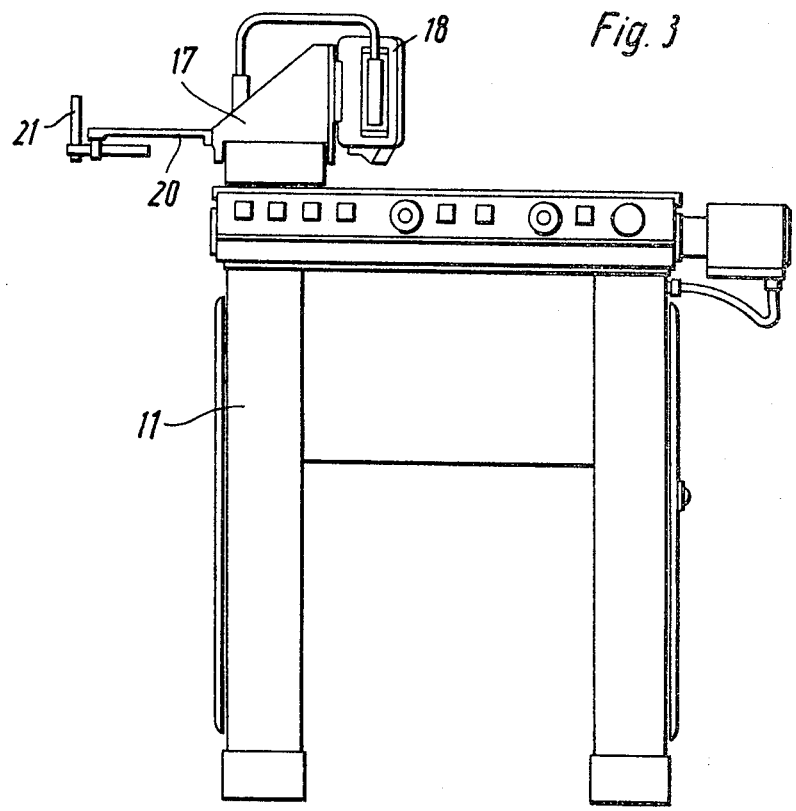
FIG. 3 is a front view of a further embodiment of the tracing device according to the invention.
Figure 4:
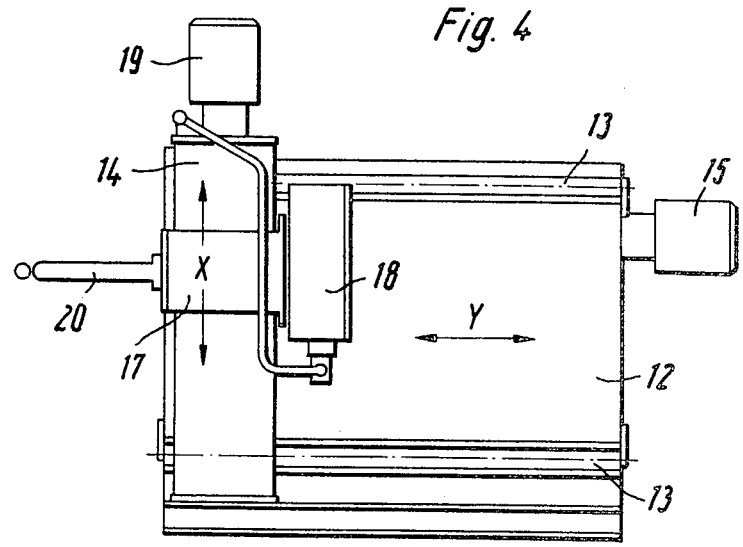
FIG. 4 is a plan view of the device according to FIG. 3.
Figure 5:
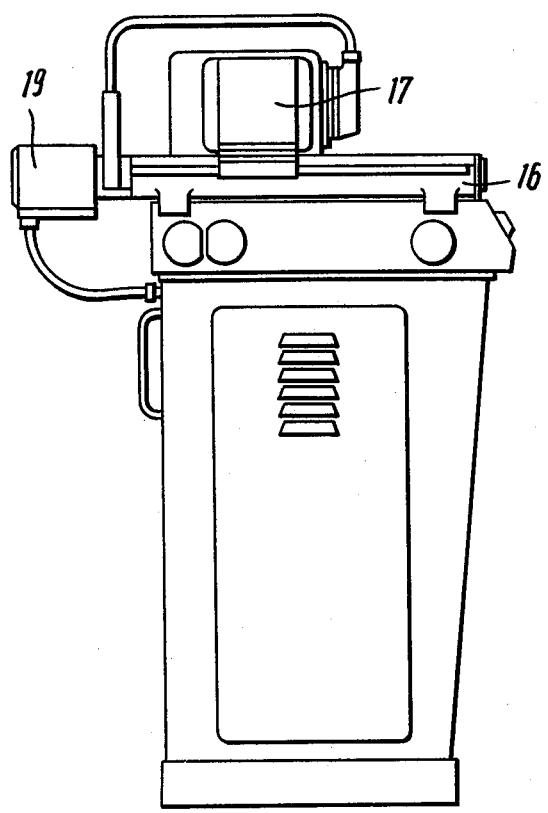
FIG. 5 is a side view of the device according to FIG. 3.

In the embodiment illustrated in FIGS. 3 to 5 a drawing support table 12 is fixedly mounted on a rugged frame 11, the two longitudinal sides of said drawing support table having guideways 13 for a cross slide 14. The said cross slide 14 may be traversed in the direction of the Y-axis on the guideways 13 by means of a servomotor 15. As may be clearly recognised by reference to FIGS. 3 and 5, the cross slide 14 is also provided with guideways 16 on both sides to accommodate retaining means 17 for a photo-electric reading head 18. A second servomotor 19, mounted on the cross slide, is provided to traverse the retaining means 17 and the reading head 18 in the cross slide guideways 16. An arm 20, on whose front end the pantograph linkage 21 is hinged, is rigidly mounted on the endface of the retaining means 17 disposed opposite to the reading head.

I claim:

1. A machine for milling in accordance with a prepared pattern, said machine comprising:
    a milling machine having a frame, a work tool and a planar work piece support table, said milling machine having means to provide a first relative motion between said work tool and said work piece support table, said first relative motion being parallel to the plane of said work piece support table, and said milling machine having means to provide a second relative motion between said work tool and said work piece support table, said second relative motion being perpendicular to the plane of said work piece support table and being controlled independently of said first relative motion; and
    a tracing device comprising;
        a planar pattern support table;
        an electro-optical reading head disposed adjacent said pattern support table for automatically following the lines of the pattern mounted thereon;
        means for providing a first relative motion between said reading head and said pattern support table in response to electrical signals generated by said reading head while automatically tracing lines on the pattern on said pattern support table, said first relative motion being parallel to the plane of said pattern support table; and
        means for providing second relative motion between said reading head and said pattern support table for adjustments in focusing said reading head with respect to said pattern, said second relative motion being perpendicular to the plane of said pattern support table and being independent of said first relative motion; and
    a multi-link pantograph mechanism having a fixed pivot attached to the frame of said milling machine and having one link pivoted thereto and projecting therefrom, and another link pivotally connected to the moving member of said milling machine, said projecting link having its distal end pivotally attached to the moving member of said tracing device, thereby transmitting said first relative motion of said tracing device on a modified scale to said milling machine to cause similar first relative motion to occur between the work tool and the work piece support table.

2. The machine according to claim 1 and further comprising:

first guideways for permitting planar motion of said pattern support table in the direction of an X-axis;

means responsive to pattern induced electrical signals produced by said reading head to move said pattern support table along said X-axis;

second guideways arranged perpendicularly to said first guideways to permit planar motion of said pattern support table in the direction of a Y-axis, said Y-axis and said X-axis being mutually orthogonal; and means responsive to pattern induced electrical signals produced by said reading head to move said pattern support table along said Y-axis;

whereby said pattern support table moves to follow the lines of the pattern, thereby producing said first relative motion of said tracing device;

said projecting link of said pantograph being pivotally attached to said pattern support table to provide said first relative motion in said milling machine in accordance with the motion of said pattern support table.

3. The machine according to claim 2 wherein:

said means for moving said pattern support table along said X-axis comprises a first servomotor electrically connected to said reading head; and said means for moving said pattern support table along said Y-axis comprises a second servomotor electrically connected to said reading head;

said first and second servomotors act together to move said pattern support table to follow the lines of the pattern.

4. The machine according to claim 1 and further comprising:

first guideways for permitting motion of said reading head in the direction of an X-axis parallel to the plane of said pattern support table;

means responsive to pattern induced electrical signals produced by said reading head to move said reading head along said X-axis;

second guideways arranged perpendicularly to said first guideways to permit motion of said reading head in the direction of a Y-axis parallel to the plane of said pattern support table, said Y-axis and said X-axis being mutually orthogonal; and means responsive to pattern induced electrical signals produced by said reading head to move said reading head along said Y-axis;

whereby said reading head moves to follow the lines of the pattern, thereby producing said first relative motion of said tracing device;

said projecting link of said pantograph being pivotally attached to said reading head for providing said first relative motion in said milling machine in accordance with the motion of said reading head.

5. The machine according to claim 4 wherein:

said means for moving said reading head along said X-axis comprises a first servomotor electrically connected to said reading head; and said means for moving said reading head along said Y-axis comprises a second servomotor electrically connected to said reading head;

said first and second servomotors act together to move said reading head to follow the lines of the pattern.

* * * * *